United States Patent [19]
Doyel

[11] 3,809,356
[45] May 7, 1974

[54] MOLDING DIE BLOCK

[76] Inventor: John S. Doyel, 404 W. 20th St., New York, N.Y. 10011

[22] Filed: Sept. 6, 1972

[21] Appl. No.: 286,717

[52] U.S. Cl.................. 249/155, 425/468, 249/105
[51] Int. Cl............................................... B28b 7/02
[58] Field of Search .......... 249/155, 156, 157, 158, 249/159, 161, 162, 66–68, 142, 146; 164/340, 397; 425/468, 242, 249, 457, 438; 74/425

[56] References Cited
UNITED STATES PATENTS

| | | | |
|---|---|---|---|
| 1,925,400 | 9/1933 | Nelson............................ | 249/158 X |
| 2,260,462 | 10/1941 | Korsmo........................... | 164/340 X |
| 2,825,093 | 3/1958 | High................................ | 425/468 |
| 3,371,387 | 3/1968 | Cleereman...................... | 425/457 |
| 1,207,698 | 12/1916 | Atterbury....................... | 249/158 X |
| 1,665,227 | 4/1928 | Smith............................... | 74/425 X |
| 2,087,021 | 7/1937 | Criner.............................. | 74/425 X |

Primary Examiner—J. Spencer Overholser
Assistant Examiner—John S. Brown
Attorney, Agent, or Firm—Cooper, Dunham, Clark, Griffin & Moran

[57] ABSTRACT

A die block for molding an object wherein the improvement is in means for changing the configuration of an object molding cavity without removing the die block from its supports and without remachining the cavity. The cavity configuration change is effected by providing a die shaft having a shaped forward end extending partly into the cavity and having a back end provided with a gear meshing with the gear at the forward end of an adjusting shaft whose back end is accessible through a side wall of the die block. The arrangement allows rotating the die shaft by means of the adjusting shaft.

4 Claims, 4 Drawing Figures

PATENTED MAY 7 1974        3,809,356
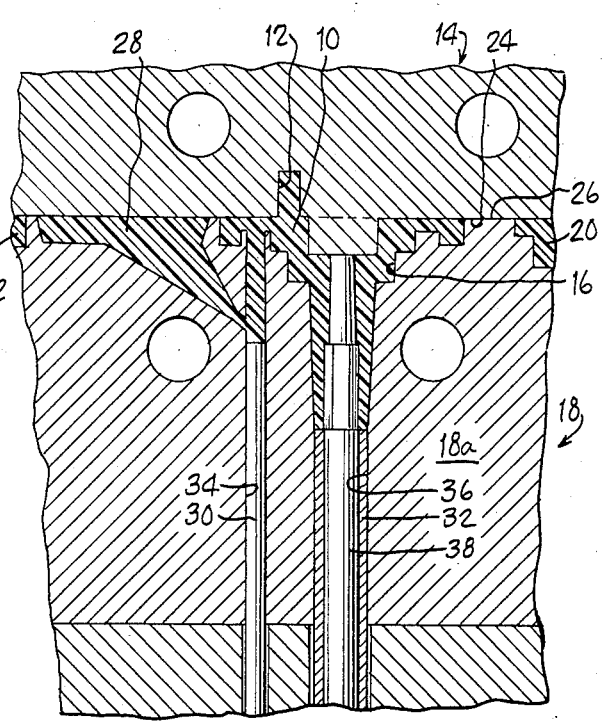
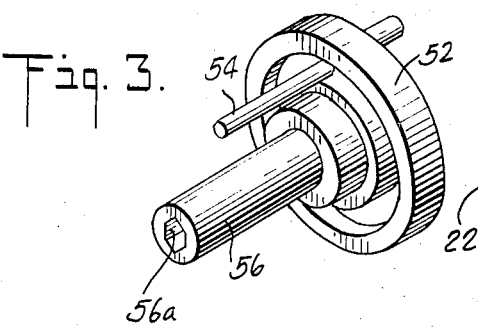
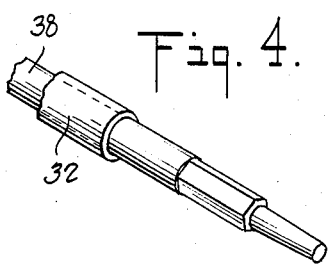
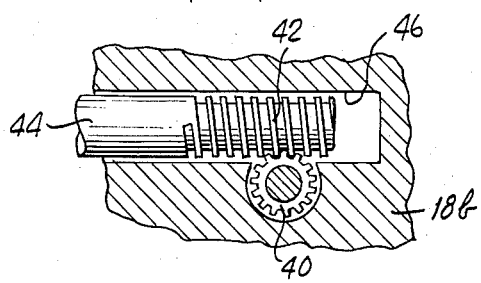
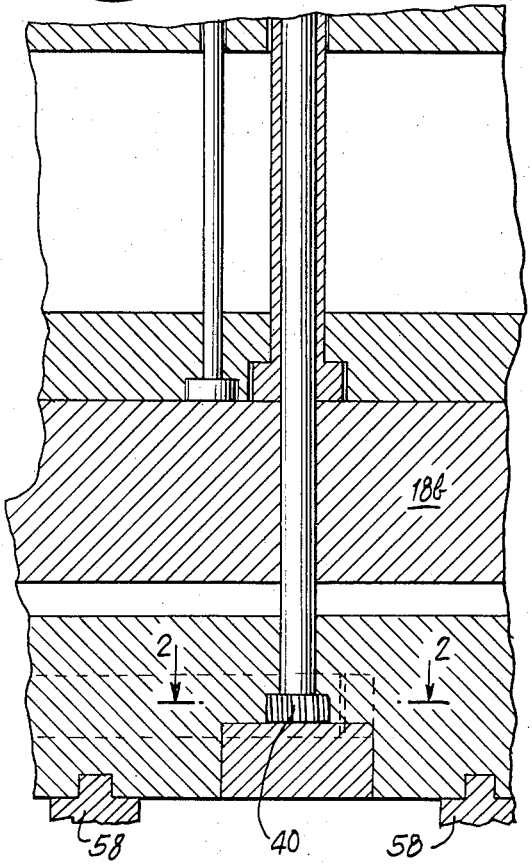
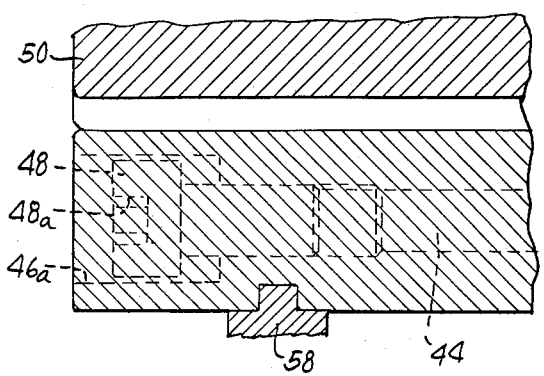

MOLDING DIE BLOCK

BACKGROUND OF THE INVENTION

The invention is in the field of die blocks for molding objects such as objects made of plastics.

Molding of plastic objects involves filling a mold cavity with a plastic fluidized by heat and pressure. Once in the cavity, the fluidized plastic is allowed to solidify, producing an object that requires only finishing operations. There are several principal processes which convert powders or granules into finished molded objects. Thus, in compression molding the two halves of a mold are attached to the two platens of a hydraulic press, one of which is moved by the ram. The platens are heated with steam or otherwise to supply heat to the molds. The cavities are filled with a predetermined amount of powder or preforms, and pressure is applied to bring the two halves of the mold together. The heat and pressure fluidize the plastic, and the mold is closed very slowly until it is seated on the land areas thereof. In transfer molding, the process is similar to compression molding except that fluidization is accomplished in an outside chamber and the fluid is forced into the mold cavities. In injection molding, a hot thermoplast is injected into a cooled mold, thereby obviating the need for alternately heating and cooling the mold. After the mold halves are closed, a plunger forces fluidized plastic through runners into the mold cavities. The plastic forced into the cavities cools rapidly and is soon ready for ejection, which is carried out by separating the mold halves and using knock-out pins.

In molding, and particularly in injection molding, the pressures that are often encountered are very high. Thus, pressures up to 25,000 psi may be used for injection molding. This requires heavy die blocks, and it is not uncommon for a die block to weigh several thousand pounds.

On occasion, it is highly desirable that the dimensions of an article manufactured by molding be very accurate. Although the objects produced from a particular mold cavity of a carefully prepared set of die blocks usually have consistent dimensions, these dimensions usually differ somewhat from the dimensions of the cavity. This difference is often difficult or impossible to predict. It has been common therefore, prior to the subject invention, to finalize the dimensions of the die cavity for an object which must conform to high accuracy requirements by repeatedly molding sample objects, measuring them to see if they still do not conform to the required dimensions, taking the die block off its supports to remachine the die cavity, then producing additional sample articles, and repeating this process until the molded articles have the desired dimensions. Since the die blocks are often very bulky and heavy, these operations are time consuming and expensive. It is desirable therefore to find a way to finalize the dimensions of a die cavity without having to take the die blocks off their supports for repeated remachining.

SUMMARY OF THE INVENTION

The invention relates to a molding die block system comprising a plurality of die blocks, and its object is to obviate the disadvantages of the prior art die blocks involved in finalizing the dimensions of an object molding cavity by providing means for changing the configuration of a cavity without removing the die block from its supports and without remachining.

To this end, one embodiment of the invention comprises a die block having a die shaft, a portion of which forms a portion of the cavity walls, and an adjusting shaft which engages the die shaft for moving it and which has a portion accessible through a wall of the die block which is free when the die block is mounted on its supports. A particular embodiment of the invention comprises a die block having walls defining an object molding cavity and having a die shaft with a forward and extending partly into the cavity and therefore defining a part of the cavity. The die shaft has a shank which is rotatably received in a suitable sleeve in the die block. An adjusting shaft is received rotatably in another sleeve in the die block and has a forward end provided with a drive gear meshing with a drive gear provided at the back end of the die shaft. The back end of the adjusting shaft is provided with a bolt head accessible through a side wall of the die block. When the bolt head of the adjusting shaft is rotated manually, the gear at the forward end of the adjusting shaft rotates the die shaft to change correspondingly the configuration of the cavity.

In particular, the forward end of the die shaft may be a polygonal stud for forming a corresponding polygonal opening in an article comprising a base and a shaft extending therefrom. By rotating the die shaft, the orientation of the polygonal opening in the drive shaft of the article with respect to the article base is changed. The article may be, for example, an eccentric cam wherein the orientation of the polygonal opening in the drive shaft thereof with respect to the eccentric pin is critical.

BRIEF DESCRIPTION OF THE DRAWINGS

FIG. 1 is a partial sectional view of two matching molding die blocks which are in the closed position and define a molding cavity.

FIG. 2 is a sectional view taken along line 2—2 of FIG. 1.

FIG. 3 is a perspective view of an article molded in the molding cavity shown in FIG. 1.

FIG. 4 is a perspective view of the forward end of a die shaft defining a portion of the cavity shown in FIG. 1.

DETAILED DESCRIPTION

An article such as the article shown in FIG. 3 is molded by a molding process such as injection molding by means of the apparatus shown in FIG. 1.

Referring to FIG. 1, an object molding cavity 10 is defined by means of cavity walls 12 in an upper molding die block 14 and by means of cavity walls 16 in a lower molding die block 18. Additional articles may be molded simultaneously in other cavities 20 and 22 defined by similar cavity walls. The lower molding die block 18 includes a moving portion 18a and a stationary portion 18b. When the die blocks 14 and 18 are in the closed position, the lands thereof are pressed against each other (e.g., lands 24 and 26 of die blocks 14 and 18 respectively) and a material such as a hot thermoplast is injected into the molding cavity 10 through a suitable runner 28 by means of a suitable plunger arrangement (not shown). After the injected thermoplast has cooled and solidified, the moveable portion 18a of the lower die block 18 is brought downwardly, toward the stationary portion 18b, by suitable means (not shown) and knockout pins 30 and 32, which are slidably received in suitable sleeves 34 and 36, respectively, in the moveable portion 18a of the lower die block 18 push the molded object out of the cavity 10. The lower ends of the knockout pins 30 and 32 are suitably affixed to the stationary portion 18b of the lower die block 18. It is noted that the knockout pin 32 is a hollow sleeve.

A portion of the molding cavity 10 is defined by the forward end of a die shaft 38 whose shank is slidably received within the knockout pin 32. The back end of the die shaft 38 terminates in a drive gear 40 which meshes with a worm gear 42 forming the forward end of an adjusting shaft 44 whose shank is rotatably received in a suitable sleeve 46 in the lower molding die block 18. The back end of the adjusting shaft 44 is provided with a bolt head 48 formed with a hexagonal driving opening 48a. The bolt head 48 of the adjusting shaft 44 is accessible through a suitable opening 46a in the side wall 50 of the lower molding die block 18. When the adjusting shaft 44 is rotated by means of a suitable Allen wrench inserted in the hexagonal opening 48a of its head 48, the worm gear engagement of the forward end of the adjusting shaft 44 and the back end of the die shaft 38 rotates the die shaft 38. This, of course, changes the orientation of the shaped forward end of the die shaft 38 with respect to the die cavity 10, and thereby changes the configuration of the die cavity 10.

One example of a situation in which it may be desirable to change the configuration of the die cavity 10 is when it is used to mold an article of the type shown in FIG. 3. The article shown in FIG. 3 has a base 52, and an eccentric pin 54 and a drive shaft 56 extending therefrom and spaced from each other. The drive shaft 56 has a central hexagonal opening 56a which is formed by the forward end of the die shaft 38 (this forward end is shown in perspective in FIG. 4). If the object shown in FIG. 3 forms a part of a precision instrument, it may be important that the relative orientation between the hexagonal drive opening 56a in the shaft 56 and the eccentric pin 54 be very accurate. Because of various factors, such as size changes between an object formed of hot thermoplast and of solidified plastic, it is often difficult or impossible to calculate the exact orientation of the portion of the cavity 10 which forms the hexagonal opening 56a. In the prior art, the final desired relative orientation between the hexagonal opening 56a and the eccentric pin 54 of the object shown in FIG. 3 would be achieved by repeatedly molding object samples and measuring them, and repeatedly remachining the cavity 10 until the cavity molds an object in which the relative orientation between the hexagonal opening 56a and the eccentric pin 54 is acceptable. When using the means described herein, the final configuration of the molding cavity 10 can be arrived at without taking the lower die block 18 off its supports 58 and without taking the moveable portion 18a of the lower die block 18 off the knockout pins 30 and 32.

In particular, the die blocks 14 and 18 are moved to their closed position shown in FIG. 1 by conventional means, and a test object is molded in the conventional manner. The test object is taken off the mold in the conventional manner and the relative orientation between the hexagonal opening 56a in its drive shaft 56 and the eccentric pin 54 is measured. If it differs from the desired relative orientation, the adjusting shaft 44 is rotated by means of a tool inserted through the opening 46a in the lower die block 18 and another test object is molded, etc. until the molded test object has the desired relative orientation between the hexagonal opening 56a in its drive shaft in the eccentric pin 54. Then, the mold is ready for mass production of objects which have the desired dimensions and the desired relative orientation of portions thereof.

I claim:

1. A molding die block system comprising a plurality of die blocks having cavity walls defining a portion of an object molding cavity which is substantially enclosed and a die shaft having a shaped forward end defining another portion of the cavity and having a back end provided with a drive gear and an intermediate shank, said defined portions of the mold cavity being asymmetrical with respect to a plane including the axis of said intermediate shank, a die block sleeve rotatably receiving the die shaft shank, an adjusting shaft having a forward end provided with a drive gear meshing with the drive gear of the die shaft to rotate the die shaft in its sleeve upon rotation of the adjusting shaft to a selected fixed angular position and having a shank and a back end, a die block sleeve rotatably receiving the adjusting shaft shank, and means defining an opening in a free side wall of a die block providing access to the back end of the adjusting shaft for manually rotating the adjusting shaft, whereby the configuration and the relative orientation of said asymmetrical portions of the object molding cavity may be selectively changed by rotating the accessible back end of the adjusting shaft to thereby rotate the shaped forward end of the die shaft without removing a die block from its supports for remachining.

2. A molding die block as in claim 1 wherein the cavity faces a forward end of the die block, the die shaft extends toward said forward end of the die block, and the back end of the adjusting shaft is adjacent a side wall of the die block, and including support means for supporting the back end of the die block which is opposite the forward end thereof.

3. A molding die block as in claim 1 wherein the gears of the die shaft and of the adjusting shaft are in a worm gear arrangement, and the die shaft and the adjusting shaft are substantially perpendicular to each other.

4. A molding die block as in claim 1 wherein the cavity walls define a cavity for a molded object having a base and a drive shaft extending therefrom, and wherein the forward end of the die shaft defines a polygonal opening in the drive shaft, whereby the orientation of said polygonal opening with respect to the object base may be changed by rotating the back end of the adjusting shaft.

* * * * *